July 2, 1963   J. DE SWART   3,095,953
GRILLE
Filed Feb. 17, 1961   2 Sheets-Sheet 1
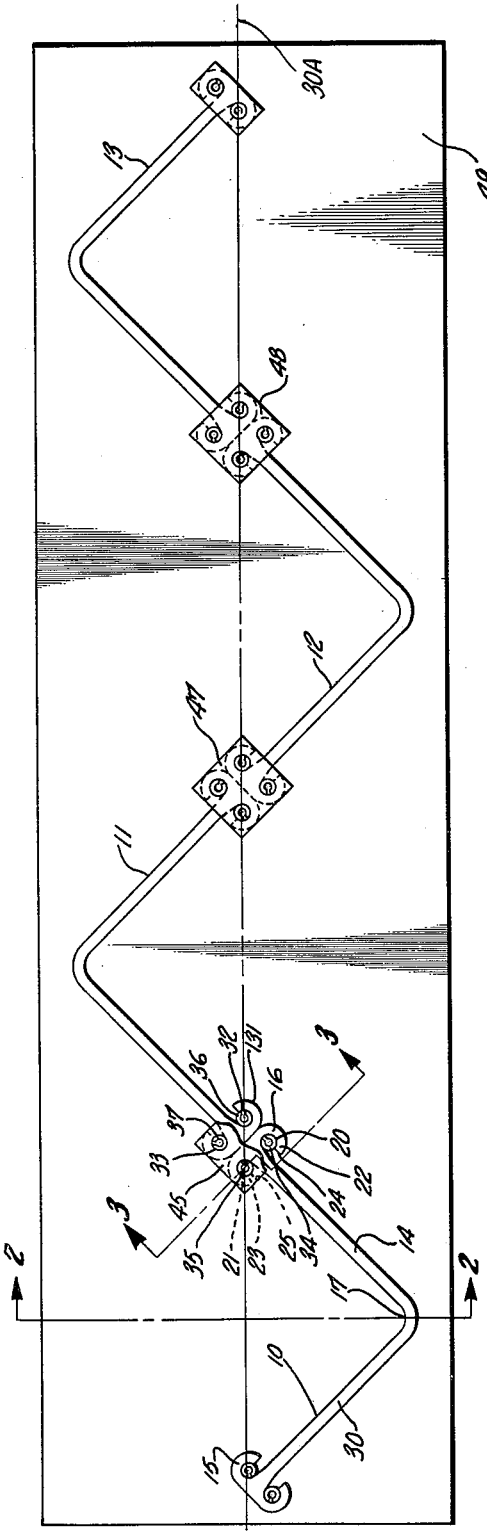
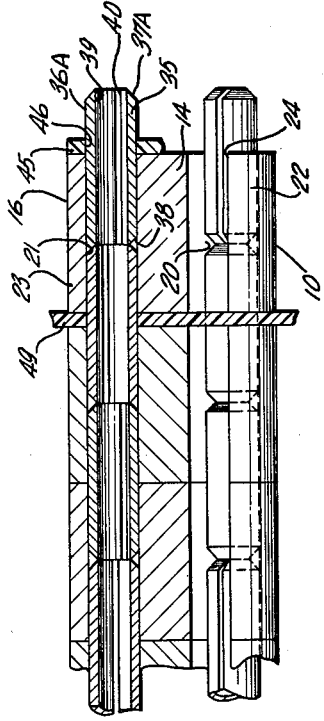
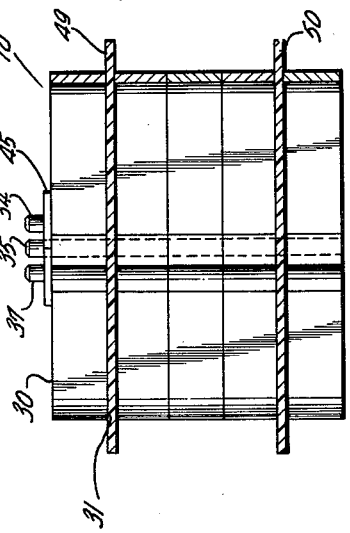
INVENTOR.
JAN DE SWART
BY Christie, Parker & Hale
ATTORNEYS.

July 2, 1963  J. DE SWART  3,095,953

GRILLE

Filed Feb. 17, 1961

INVENTOR.
JAN DE SWART
BY Christie, Parker & Hale
ATTORNEYS.

United States Patent Office 3,095,953
Patented July 2, 1963

3,095,953
GRILLE
Jan de Swart, 5833 Eucalyptus Lane, Los Angeles, Calif.
Filed Feb. 17, 1961, Ser. No. 90,028
8 Claims. (Cl. 189—82)

The invention relates to grilles of the type made up of individual links disposed in end-to-end relation with their ends held together by removable fastening means.

The invention provides links of unique geometrical configuration and means for fastening the links together whereby grilles of pleasing appearance and having a multitude of useful applications may be quickly and easily erected. The invention includes grilles comprised of such links and fastening means. Grilles erected with the inventive apparatus are relatively rigid and stable and have a multitude of useful applications, such as aesthetic screening, wind and sun control, display shelving, egg-crate light diffusion, and the like. Through the inventive structure, the links are connected together in such manner that there is little or no play between their ends, thus providing a rigid and stable grille, and this is achieved without close tolerance manufacturing and the expense attendant thereto.

The inventive apparatus includes, broadly, a plurality of geometrically congruent links wherein each link has an elongated web and a head on each end of the elongate extent of the web. The heads are symmetrical about the mid-point of the elongate extent of the web, and each head defines at least one aperture extending through the head. The axes of the apertures are parallel and perpendicular to the elongate extent of the web. The axes of the apertures in both heads are parallel to each other and symmetrical about the mid-point of the elongate extent of the web. The links are disposed in end-to-end relation with their heads adjacent. Connecting means disposed in the apertures in adjacent heads of adjacent links connects the links together, and this connecting means includes pins disposed in such apertures and having exterior surfaces in engagement with the surfaces defining the apertures. Means is provided for effecting resilient radial displacement of the pins and the apertures relative to each other responsive to disposition of the pins in the apertures in order to effect biased frictional engagement between the surfaces of the pins and the surfaces of the apertures. This frictional engagement through resilient displacement effects a secure connection without play which does not necessitate manufacturing to precision tolerances and is an important feature of the invention.

The inventive apparatus may take various specific embodiments. In one embodiment, the adjacent heads of adjacent links are juxtaposed with the apertures in such heads coaxial. In this embodiment, the pins are disposed partially in the apertures in one such head and extend into the coaxial apertures in the other such head. In another embodiment of the inventive apparatus, adjacent heads of adjacent links abut each other with the apertures in such heads spaced from each other in a direction perpendicular to their axes and with the axes of such apertures in both heads parallel to each other and aligned with each other.

The invention will be fully understood from a reading of the following description in conjunction with the accompanying drawings, in which:

FIG. 1 shows a plan view of one embodiment of the inventive apparatus;

FIG. 2 is a sectional elevational view along the line 2—2 in FIG. 1;

FIG. 3 is a fragmentary sectional elevational view to enlarged scale along the line 3—3 in FIG. 1, said view being rotated ninety degrees;

Figure 4:
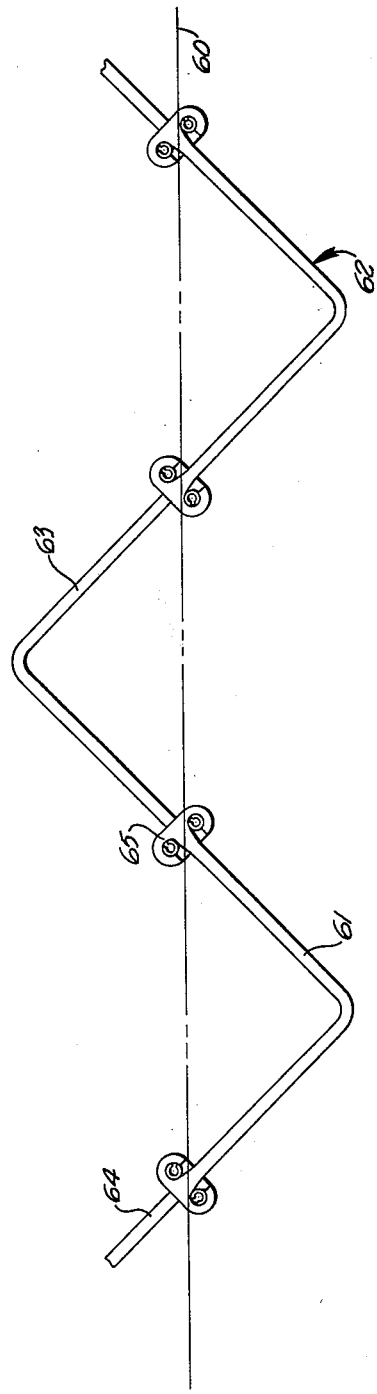
FIG. 4 is a plan view of another embodiment of the inventive apparatus.

Referring to FIG. 1, a plurality of links 10, 11, 12, and 13 are shown arranged according to an embodiment of the invention. Links 10, 11, 12, and 13 are each geometrically congruent to each other and in all respects identical, and for this reason only link 10 will be described in detail. Link 10 is made of resilient material, such as metal, and may be an aluminum extrusion. Link 10 is comprised of an elongated web 14 having a head 15 on one end and a head 16 on the other end. Web 14 may have various plan configurations between heads 15 and 16 and, as illustrated, has a ninety degree bend at the mid-point 17 of its elongate extent. Alternatively, the web may be an arc of a circle. Heads 15, 16 are identical to each other and are symmetrical about mid-point 17 of web 14. The symmetry of heads 15, 16 about mid-point 17 of web 14 is an essential feature of the invention because it results in the links being modular and therefore susceptible to arrangement in repetitive patterns to effect the advantageous results of the inventive apparatus. Since heads 15, 16 are identical, only head 16 will be described in detail. Head 16 defines a pair of generally cylindrical apertures 20, 21 extending through the head with their central axes parallel to each other and perpendicular to the elongate extent of web 14. The central axes of apertures 20, 21 are disposed on opposite sides of web 14, and each such axis is spaced equally from the web. Head 16 includes a thin resilient wall 22 which defines a portion of the exterior of the head and also defines a portion of the wall of aperture 20. Wall 22 terminates at 24 in spaced relation from web 14 to define a gap extending between the exterior of head 16 and the interior of aperture 20. This gap is an important feature of the invention because it greatly reduces the expense of making the links through extrusion processes and also because of the resilient displacement of wall 22 which it permits, as explained below. In similar manner, head 16 includes a second resilient wall 23 which defines a portion of the exterior of the head and also defines a portion of the wall of aperture 21. Wall 23 terminates at 25 in spaced relation from web 14 to define a gap extending between the exterior of head 16 and the interior of aperture 21. The function of resilient walls 22, 23 will be described below. The axes of apertures 20, 21 in head 16 are parallel to the axes of the identical apertures in head 15, and the axes of the apertures in heads 15, 16 are symmetrical about mid-point 17 of web 14. Sides 30, 31 of link 10 transverse to the axes of the apertures in heads 15, 16 are planar and perpendicular to the axes of such apertures. It is to be understood that the gaps defined between web 14 and the ends 24, 25 of walls 22, 23, respectively, communicate to their respective apertures 20, 21, respectively, over an arc of about ninety degrees or less of such apertures measured about their central axes. As an alternative, there may be only one aperture in each head with their axes parallel and symmetrical about the mid-point of the web.

The links are disposed in end-to-end relation with their heads adjacent and lying on a common straight axis extending in the direction of the elongate extent of the webs of the links with adjacent links disposed symmetrically on each side of such axis. FIG. 1 illustrates the links so disposed in one embodiment of the invention, and, as illustrated, alternate links, such as links 10, 11, are disposed symmetrically on each side of axis 30A.

Alternatively, the axis of symmetry of the links may be arcuate or sinusoidal instead of straight.

Links 10, 11, 12 and 13 are coplanar and the adjacent heads of adjacent links abut each other, such as head 16 of link 10 and head 131 of link 11. The pairs of apertures in the adjacent heads of adjacent links are spaced from each other in a direction perpendicular to their axes with the axes of the apertures in both heads parallel to each other and aligned with each other as is, for example, illustrated in FIG. 1 for apertures 20, 21 in head 16 and apertures 32, 33 in head 131 of link 11, it being understood that link 11 is in all respects identical with link 10.

Connecting means is disposed in the apertures in adjacent heads of adjacent links for connecting the links together. This connecting means includes elongated cylindrical pins disposed in such apertures. These pins are indicated in FIG. 1 at 34, 35, 36, and 37 for adjacent heads 16, 31 of adjacent links 10, 11. All the pins are identical so that only one will be described in detail. As shown in greater detail in FIG. 3, pin 35 defines a cylindrical exterior surface 36A which is geometrically similar to and slightly larger than the surface defining aperture 21 in head 16. Pin 35 also has the periphery of each end beveled inwardly at 37A and 38 and defines a central longitudinal bore 39 extending through the pin and also a longitudinal slot 40 which extends the length of the pin and extends from the exterior surface 36A of the pin to the central bore 39. Bore 39 is of such diameter relative to the exterior diameter of pin 35 that pin 35 becomes a resilient cylindrical shell, the resiliency being produced by the thin resilient walls of pin 35 defined by bore 39. The pins are made of resilient material such as metal. Insertion of pin 35 is facilitated by beveled ends 37A, 38, and since exterior surface 36A of pin 35 is similar to and slightly larger than the surface of aperture 21, it is apparent that when pin 35 has been inserted in aperture 21 there is frictional engagement between exterior surface 36A of pin 35 and the surface of aperture 21. This frictional engagement serves to hold the pin in place and is securely maintained through resilient radial displacement of pin 35 and aperture 21 relative to each other, thereby effecting a biased frictional engagement therebetween. This resilient displacement is twofold in that slot 40 in pin 35 permits such pin to resiliently displace radially to a slightly smaller external circular periphery, and the gap defined between web 14 and end 25 of wall 23 permits such wall to resiliently displace radially outwardly from web 14 to slightly enlarge the periphery of aperture 21. As a consequence, pin 35 is biased radially outwardly in frictional engagement with aperture 21 and aperture 21 is biased radially inwardly in frictional engagement with surface 36A of pin 35. It is to be understood that it is only necessary that there be resilient displacement of pin 35 and aperture 21 relative to each other so that, for example, gap 40 may be omitted from pin 35 so that all of the resilient displacement is effected by wall 23, which would displace outwardly and therefore be biased inwardly against surface 36A of pin 35. Alternatively, the gaps in the heads may be omitted and all of the displacement effected by the slotted pins. This biased frictional engagement between the pins and the heads is an important feature because it provides a secure, tight fit without the necessity for manufacturing the pins and heads to close tolerances to secure such a fit and the expense attendant upon such manufacturing.

Pins 34, 35, 36, and 37 extend exteriorly of the heads in which they are disposed on the same side thereof and through a tie plate 45 which defines apertures, such as aperture 46, aligned with the apertures in the heads to receive such pins. Tie plate 45 is a planar member and effects the completed connection of adjacent heads 16, 131 of adjacent links 10, 11. Tie plates identical to tie plate 45 are indicated at 47 and 48 in FIG. 1. As illustrated in FIG. 3, the pins extend through the tie plates and exteriorly of such tie plates; such exterior extension of the pins beyond the tie plates may receive a decorative cap or head (not shown) which has an aperture to receive the extension of the pin and a decorative exterior surface surrounding such extension of the pins. The tie plates may, in effect, be enlarged to one large tie plate, indicated at 49 in FIG. 1, which is a planar member and extends continuously over the heads of the links and also extends a substantial amount in a direction transverse to axis 30A. Plate 49 defines a plurality of apertures aligned with the apertures in the heads of links 10, 11, 12, and 13 which receive the pins disposed in the apertures in such heads.

There may be a plurality of rows of links with each row superimposed upon another row with the apertures in the heads of the links in each row coaxial with the apertures in the corresponding heads of the links in each other row. Referring to FIG. 2, the rows of links under the top row of links 10, 11, 12, and 13 are in all respects identical to such top row, except that tie plates may be omitted. If desired, enlarged tie plates 49, 50 may be sandwiched between superimposed rows of links, and, in the arrangement illustrated, such plates 49, 50 may be utilized as shelves with the rows of links serving as the support for the shelves. When superimposed rows of links are utilized, the pins bridge between rows of links so that the pins are disposed in abutting end-to-end relation with a portion disposed in the apertures in the heads of the links in one row and with a portion disposed in the coaxial apertures in the heads of the links in the next adjacent superimposed row, as is clearly illustrated in FIG. 3.

Figure 5:
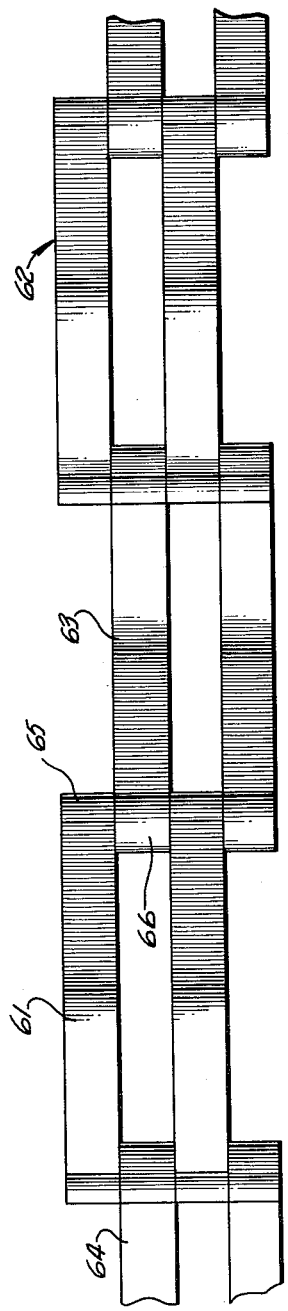
FIG. 5 is an elevational view of the apparatus shown in FIG. 4.

FIGS. 4 and 5 illustrate another embodiment of the invention. The links and pins are in all respects identical to those described above and, as shown in FIG. 4, the links are disposed in end-to-end relation with their heads adjacent and lying on a common straight axis 60 and with alternate links symmetrically disposed on each side of such axis. Alternate links in each row of links are coplanar, such as links 61, 62, with the other links in the row, such as links 63, 64, also coplanar but in a plane spaced from and parallel to the plane of the first mentioned links. It is thus apparent that in each row of links the links alternate between spaced parallel planes. The pairs of apertures in adjacent heads of adjacent links, such as heads 65, 66 of links 61, 63, respectively, are coaxial and the pins bridge between the links with a portion of the pin disposed in the apertures in one such head and extending into the coaxial apertures in the other abutting head to lock the links together and against relative movement. If desired, enlarged tie plates, such as tie plate 49 described above, may be utilized in conjunction with the embodiment illustrated in FIGS. 4 and 5, in which case the tie plate has apertures aligned with the apertures in the heads of the links to receive the pins. Also, as shown in FIG. 5, several superimposed rows of links may be utilized, this being particularly advantageous when the structure is to be used as a screen to control light or wind. When several superimposed rows of links are utilized, as shown in FIG. 5, the pins abut in end-to-end relation and bridge between rows of links with a portion of each pin disposed in the aperture in the head of a link in one row and a portion disposed in the coaxial aperture in the head of a link in the next adjacent superimposed row of links to lock all of the rows of links together into a unitary, relatively rigid grille.

I claim:
1. A grille comprising a plurality of geometrically congruent links, each link comprising an elongated web and a head on each end of the elongate extent of the web, said heads being symmetrical about the mid-point of the elongate extent of the web, each head defining at least one aperture extending through the head with their axes parallel and perpendicular to the elongate extent of the web, said links being disposed in end-to-end relation with their heads adjacent, connecting means disposed in the apertures in adjacent heads of adjacent links for connecting the links together, said connecting means including pins disposed in such apertures and having exterior surfaces in engagement with the surfaces defining the apertures in the heads, and means for effecting resilient displacement of the pins and the apertures relative to each other responsive to disposition of the pins in the apertures for biased frictional engagement between the surfaces of the pins and the surfaces of the apertures.

2. A grille comprising a plurality of geometrically congruent links, each link comprising an elongated web and a head on each end of the elongate extent of the web, said heads being symmetrical about the mid-point of the elongate extent of the web, each head defining a pair of cylindrical apertures extending through the head with their axes parallel and perpendicular to the elongate extent of the web, said axes of each pair of apertures being disposed on opposite sides of the web and spaced equally therefrom, the axes of the apertures in both heads being parallel to each other and symmetrical about the mid-point of the elongate extent of the web, and each head defining a thin resilient wall defining a portion of the exterior of the head and a portion of each aperture and which terminates in spaced relation from the web of the link to define a gap extending between the exterior of the head and the interior of the aperture, said links being disposed in end-to-end relation with their heads adjacent and lying on a common straight axis extending in the direction of the elongate extent of the webs with adjacent links disposed symmetrically on each side of such axis, connecting means disposed in the apertures in adjacent heads of adjacent links for connecting the links together, said connecting means including elongated cylindrical pins disposed in such apertures and having exterior surfaces geometrically similar to and slightly larger than the surfaces defining the apertures in the heads, said pins having the periphery of each end beveled inwardly and defining a central longitudinal bore and a longitudinal slot extending through the pin from the exterior thereof to the central bore therein, so that there is resilient displacement of the pins and the apertures relative to each other responsive to disposition of the pins in the apertures for biased frictional engagement between the surfaces of the pins and the surfaces of the apertures.

3. A grille comprising a plurality of geometrically congruent links, each link comprising an elongated web and a head on each end of the elongate extent of the web, said heads being symmetrical about the mid-point of the elongate extent of the web, each head defining a pair of cylindrical apertures extending through the head with their axes parallel and perpendicular to the elongate extent of the web, said axes of each pair of apertures being disposed on opposite sides of the web and spaced equally therefrom, the axes of the apertures in both heads being parallel to each other and symmetrical about the mid-point of the elongate extent of the web, and each head defining a wall defining a portion of the exterior of the head and a portion of each aperture and which terminates in spaced relation from the web of the link to define a gap extending between the exterior of the head and the interior of the aperture, said links being disposed in end-to-end relation with their heads adjacent and lying on a common straight axis extending in the direction of the elongate extent of the webs with adjacent links disposed symmetrically on each side of such axis, connecting means disposed in the apertures in adjacent heads of adjacent links for connecting the links together, said connecting means including pins disposed in such apertures and having exterior surfaces in engagement with the surfaces defining the apertures in the heads, and means for effecting resilient displacement of the pins and the apertures relative to each other responsive to disposition of the pins in the apertures for biased frictional engagement between the surfaces of the pins and the surfaces of the apertures.

4. A grille comprising a plurality of geometrically congruent links, each link comprising an elongated web and a head on each end of the elongate extent of the web, said heads being symmetrical about the mid-point of the elongate extent of the web, each head defining a pair of cylindrical apertures extending through the head with their axes parallel and perpendicular to the elongate extent of the web, said axes of each pair of apertures being disposed on opposite sides of the web and spaced equally therefrom, the axes of the apertures in both heads being parallel to each other and symmetrical about the mid-point of the elongate extent of the web, and each head defining a thin resilient wall defining a portion of the exterior of the head and a portion of each aperture and which terminates in spaced relation from the web of the link to define a gap extending between the exterior of the head and the interior of the aperture, said links being disposed in end-to-end relation with their heads adjacent and lying on a common straight axis extending in the direction of the elongate extent of the webs with adjacent links disposed symmetrically on each side of such axis, connecting means disposed in the apertures in adjacent heads of adjacent links for connecting the links together, said connecting means including elongated cylindrical pins disposed in such apertures and having exterior surfaces geometrically similar to and slightly larger than the surfaces defining the apertures in the heads, said pins having the periphery of each end beveled inwardly, so that there is resilient radial displacement of the pins and the apertures relative to each other responsive to disposition of the pins in the apertures for biased frictional engagement between the surfaces of the pins and the surfaces of the apertures.

5. Apparatus in accordance with claim 4 wherein the adjacent heads of adjacent links are juxtaposed with the pairs of apertures in such heads coaxial, and the pins are disposed partially in the apertures in one such head and partially in the coaxial apertures in the other such head.

6. Apparatus in accordance with claim 4 wherein the adjacent heads of adjacent links abut each other with the pairs of apertures in such heads spaced from each other in a direction perpendicular to their axes and with the axes of the apertures in both such heads parallel to each other and aligned with each other.

7. Apparatus in accordance with claim 4 wherein the pins in the apertures in adjacent heads of adjacent links extend exteriorly of the heads on the same side thereof and through a tie plate defining apertures aligned with the apertures in the heads and receiving the pins.

8. Apparatus in accordance with claim 7 wherein the tie plate is planar and extends continuously over the links in end-to-end relation and also extends a substantial amount in a direction transverse to the common straight axis of the links extending in the direction of the elongate extent of the webs of the links, and there are a plurality of rows of links disposed in end-to-end relation, each row being superimposed upon another row with the apertures in the heads of the links in each row coaxial with the apertures in the corresponding heads of the links in each other row, and the pins are disposed partially in the apertures in the heads of the links in one row and partially in the coaxial apertures in the heads of the links in an adjacent superimposed row of links.

References Cited in the file of this patent

UNITED STATES PATENTS

| | | |
|---|---|---|
| 1,721,643 | Shulman | July 23, 1929 |
| 2,685,354 | Collins | Aug. 3, 1954 |
| 3,004,642 | Hallock | Oct. 17, 1961 |